(12) United States Patent
Ursua (10) Patent No.: US 7,083,382 B2
(45) Date of Patent: Aug. 1, 2006

(54) VERTICAL AXIS WIND TURBINE

(76) Inventor: Isidro U. Ursua, #7 Sunrise St., Rimview Park, Concepcion Dos, Marikina City 1811 (PH)

( * ) Notice: Subject to any disclaimer, the term of this patent is extended or adjusted under 35 U.S.C. 154(b) by 21 days.

(21) Appl. No.: 10/399,766

(22) PCT Filed: Oct. 16, 2001

(86) PCT No.: PCT/PH01/00002

§ 371 (c)(1),
(2), (4) Date: Jun. 10, 2003

(87) PCT Pub. No.: WO02/38954

PCT Pub. Date: May 16, 2002

(65) Prior Publication Data

US 2003/0185666 A1 Oct. 2, 2003

(30) Foreign Application Priority Data

Nov. 13, 2000 (PH) ................................ 1-2000-03130
Jun. 26, 2001 (EP) ............................................ 01305525

(51) Int. Cl.
*F03D 1/06* (2006.01)

(52) U.S. Cl. .................. 416/110; 416/132 B; 416/140; 416/228

(58) Field of Classification Search .................. 415/4.2, 415/4.4, 60, 130, 907; 416/110, 132 B, 140, 416/228, 23, 120; 290/44, 55
See application file for complete search history.

(56) References Cited

U.S. PATENT DOCUMENTS

| 1,225,033 | A | * | 5/1917 | Jackson ....................... 415/141 |
| 2,128,592 | A | | 8/1938 | Mushkin |
| 4,052,134 | A | | 10/1977 | Rumsey |
| 4,137,009 | A | | 1/1979 | Telford |
| 4,191,506 | A | | 3/1980 | Packham |
| 4,247,251 | A | | 1/1981 | Wuenscher |
| 4,383,801 | A | | 5/1983 | Pryor |
| 4,468,169 | A | | 8/1984 | Williams |
| 4,618,313 | A | | 10/1986 | Mosiewicz |
| 5,193,978 | A | * | 3/1993 | Gutierrez ...................... 416/24 |
| 5,256,034 | A | | 10/1993 | Sultzbaugh |
| 5,266,006 | A | | 11/1993 | Tsui et al. |
| 5,503,525 | A | * | 4/1996 | Brown et al. .................. 416/24 |

FOREIGN PATENT DOCUMENTS

| DE | 27 18 608 A1 | 11/1978 |
| FR | 2 426 813 | 5/1978 |
| FR | 2 426 813 | 12/1979 |
| GB | 2 008 202 A | 5/1979 |
| GB | 2 068 472 A | 8/1981 |
| GB | 2 241 747 A | 9/1991 |
| KR | 1983-0008035 | 11/1983 |
| WO | WO 92/01866 | 2/1992 |

* cited by examiner

Primary Examiner—Ninh H. Nguyen
(74) Attorney, Agent, or Firm—Squire, Sanders & Dempsey LLP (57) ABSTRACT

The present invention provides a prime mover (2) for harnessing energy from a flow of fluid, the prime mover (2) comprising a shaft (4) having a rotational axis, arranged to be rotatably mounted to a substructure, the shaft (4) comprising at leas one arm (6) extending radially from the shaft (4), the or each arm (6) comprising at least one blade (8) wherein the or each blade (8) is oriented such that flow action on the blade (8) effects rotation of the shaft (4), characterized in that the or each blade (8) is movably mounted on an arm (6) and wherein each blade (8) is movable from a first position, having a first drag, to a second position, having a second drag, wherein the first drag is higher than the second drag. The prime mover (2) of the invention provides substantially reduced drag in a flow of fluid, and an increased torque output, compared to prior art prime movers.

17 Claims, 10 Drawing Sheets

VERTICAL AXIS WIND TURBINE

TECHNICAL FIELD OF THE INVENTION

This invention relates to a prime mover, and in particular to a prime mover which harnesses energy from a flow of fluid. The invention also extends to a method of generating energy and an energy-generating device.

BACKGROUND OF THE INVENTION

Renewable and non-polluting sources of energy are currently in high demand. Traditional sources of generating energy such as the combustion of fossil fuels, including coal, natural gas and oil, are becoming less and less favored due to their environmental disadvantages. The combustion of coal, oil or gas generates large quantities of carbon dioxide, oxides of sulfur and nitrogen, and other pollutant gases, which may contribute to global warming, acid rain, air pollution and a number of other environment and health damaging effects. World reserves of coal, oil and natural gas are also thought to be relatively low, and may run out in the foreseeable future.

Other sources of energy include nuclear fission, whereby atoms of radioactive elements are bombarded with a neutron source, which splits the radioactive element into an element or elements of smaller atomic mass, generating massive quantities of energy in the process. Unfortunately, the use of radioactive materials means that environmentally safe methods of disposal of waste are difficult to achieve. The radioactive waste generated is commonly stored in sealed containers and then buried in restricted access landfill sites or dumped at sea. There have been many occurrences of radioactive waste leaking from these containers and damaging the local environment. The damage caused by radioactive waste may be irreversible and the radiation generated by the waste may last decades.

Thus, there is a strong desire to produce non-polluting and renewable energy sources. Known non-polluting and renewable energy resources include tidal-powered electricity generators, and wind-powered electricity generators. These types of generators generally employ turbine blades extending from a central hub, and which blades are designed to translate the linear motion of wind or tidal water into rotational motion of the central hub, which is connected to a suitable energy generator. Known generators of this type generally employ turbine blades which are rigidly fixed to the central hub and are orientated such that leading blades are aerodynamically configured in the optimal position to convert fluid linear motion into rotational motion. However, this configuration of fixed blades means that trailing blades are not optimally configured to reduce drag and thus prevent the maximum amount of linear to rotational motion available to generators. Thus the optimal conversion of linear to rotational motion may not be achieved using these known systems, and consequently, optimal energy generation is not possible.

It is an aim of preferred embodiments of the present invention to overcome or mitigate at least some of the disadvantages of the prior art systems described above, or other disadvantages, whether described above or not.

SUMMARY OF THE INVENTION

According to the present invention there is provided a prime mover for harnessing energy from flow of a fluid, the prime mover comprising a shaft having a rotational axis, arranged to be rotatably mounted to a substructure, the shaft comprising at least one arm extending radially from the shaft, the or each arm comprising at least one blade, wherein the or each blade is oriented such that fluid flow acting on the blade effects rotation of the shaft, characterized in that the or each blade is movably mounted on an arm and wherein each blade is movable from a first position, having a first drag, to a second position, having a second drag, wherein the first drag is higher than the second drag.

Suitably the flow of fluid effects movement of the or each blade from the first to the second position as the shaft is rotated.

Preferably the surface area of the or each blade impinged on by the fluid is greater in the first position than in the second position.

Preferably the flow of fluid effects movement of the or each blade from the second position back to the first position as the shaft completes a full rotation.

The prime mover may comprise two arms extending radially from the shaft, but preferably comprises at least three arms, more preferably at least four arms, still more preferably at least five arms and most preferably at least six arms.

Suitably there are at least two arms, and at least one blade is in the second position when at least one other blade is in the first position.

Thus, in preferred embodiments, impingement of a blade by the fluid when in the first position effects rotation of the shaft As the shaft rotates the blade is oriented such that the flow of fluid moves the blade from the first position to the second position, in which there is lower drag. As the blade moves towards the second position, another blade on another arm moves into the first position whereby water impinging on said blade causes further rotation of the shaft. The blade in the second position, having a lower drag than the blade in the first position, reduces the drag on the prime mover than would otherwise be affected by non-movable blades, and hence, effects increased torque output of the prime mover.

Suitably each blade and/or arm comprises means to limit movement of each blade on an arm to a prescribed amount. Preferably, the movement limiting means is arranged to limit movement of each blade on an arm to between the first and second positions.

Preferably each blade is rotatably mounted to an arm such that the blade may be rotated from the first to the second position. Suitably each blade is rotatable about an axis running substantially parallel with the rotational axis of the shaft. Preferably the movement limiting means is arranged to limit rotation of each blade to a prescribed angular displacement, more preferably to limit rotation of each blade to between the first and second positions.

Preferably each arm and/or blade comprises means to prevent each blade moving between the first and second positions until the shaft has rotated a prescribed distance.

The means to prevent each blade from moving between the first and second positions until the shaft has rotated a prescribed angular distance, and the movement limiting means, may comprise the same means. Suitably the prescribed distance is at least 90°, preferably at least 120° and more preferably at least 150°. Preferably the prescribed distance is no more than 180°.

Suitably the angular displacement between each adjacent arm is substantially Identical. Thus when only two arms are present, the arms are suitably diametrically opposed about the rotational axis of the shaft.

Each arm may comprise more than one blade, each blade being preferably movably mounted on the arm. The blades are suitably mounted at prescribed intervals extending along the arm. The blades may overlap. Alternatively, the blades may be mounted superposed at one region of the arm. When the blades are mounted superposed at one region of the arm, there may be a separate movement limiting means for each blade or a single movement limiting means to limit movement of all blades on an arm, to a prescribed amount.

The or each blade may comprise any suitable configuration which effects a higher drag in the first position than in the second position. The or each blade may comprise an elongate member having front and back substantially planar rectangular surfaces and having a substantially wedge-shaped cross-section, kite-shaped cross-section, rectangular cross-section, lozenge-shaped cross-section, or airfoil-shaped cross-section. The or each blade may have a trim tab attached to the blade tip or blade trailing edge, partly or completely spanning the blade tip or blade trailing edge.

Suitably the prime mover is arranged to be rotatably mounted to any suitable sub-structure, such as an energy-generating apparatus including a dynamo electricity generator, with or without an attached gearbox.

Suitably the prime mover is arranged to be rotatably mounted on a sub-structure such that the rotational axis of the shaft is substantially vertical with respect to ground level.

Suitably the fluid is air or water. Thus the prime mover may be used as part of an air-powered generating system, such as a wind-powered generator, a tidal-powered energy generating system or an energy generating system powered by the flow of river water.

According to a second aspect of the present invention there is provided an energy-generating device comprising a prime mover as described hereinabove, connected to an energy generating apparatus.

Suitably the energy generating apparatus is an electricity generator of any suitable type, which can convert rotary motion of the shaft of the prime mover, to electricity generation.

Preferably, the energy generating apparatus is a dynamo, with or without an attached gearbox. According to a third aspect of the present invention there is provided a method of generating energy from flow of a fluid, the method comprising mounting the prime mover described hereinabove to a suitable energy generating device and locating the resultant apparatus in a flow of fluid.

Suitably the prime mover is oriented in the flow of fluid such that the rotational axis of the shaft is oriented substantially vertically with respect to ground level and the arms extend radially substantially horizontally with respect to ground level.

Suitably the prime mover mounted to the energy generating apparatus, is located in a flow of air or water.

BRIEF DESCRIPTION OF THE DRAWINGS

For a better understanding of the invention, and to show how embodiments of the same may be carried into effect, reference will now be made to the accompanying diagrammatic drawings in which.

DETAILED DESCRIPTION OF PREFERRED EMBODIMENT OF THE INVENTION

Figure 1:
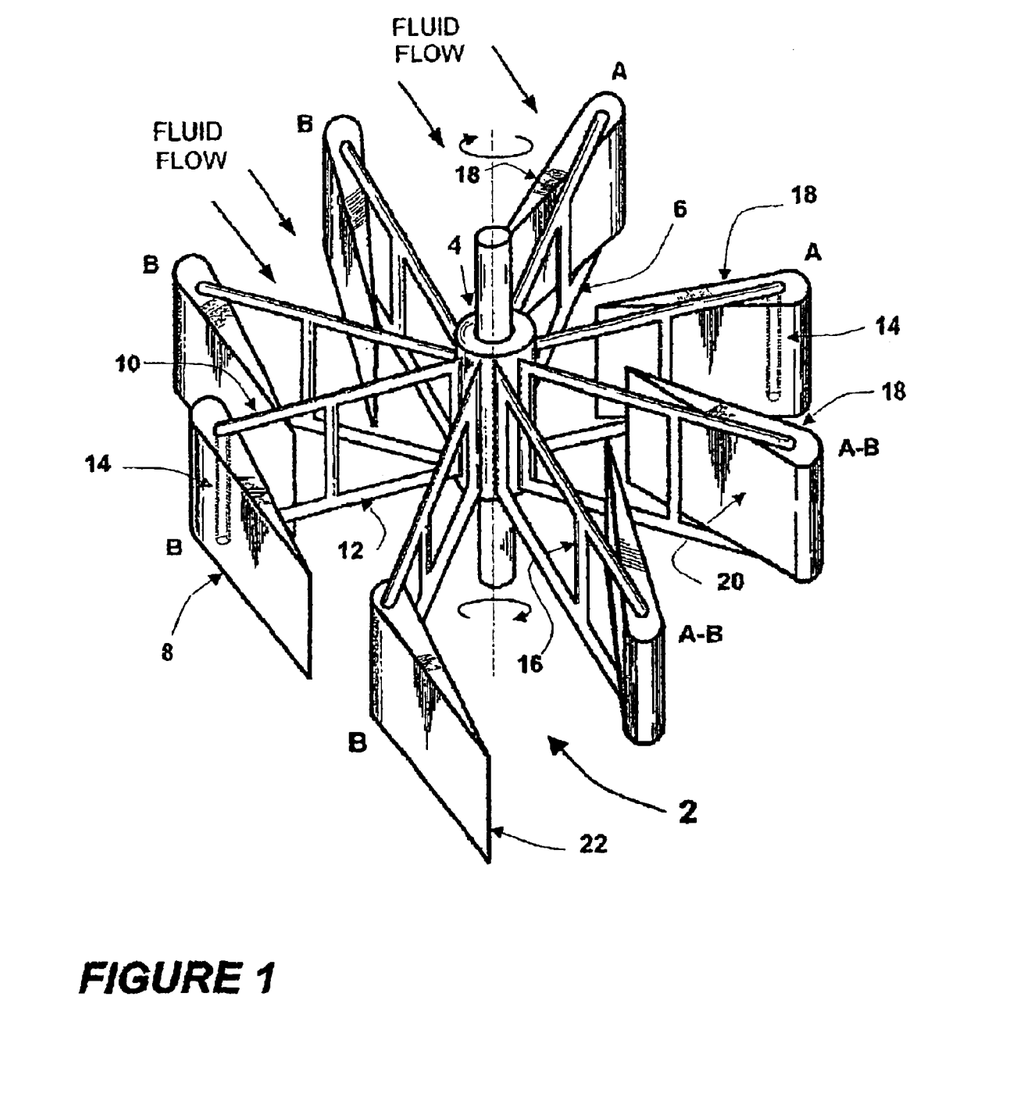
FIG. 1 illustrates a perspective view of a preferred embodiment of the prime mover of the invention.
Figure 2:
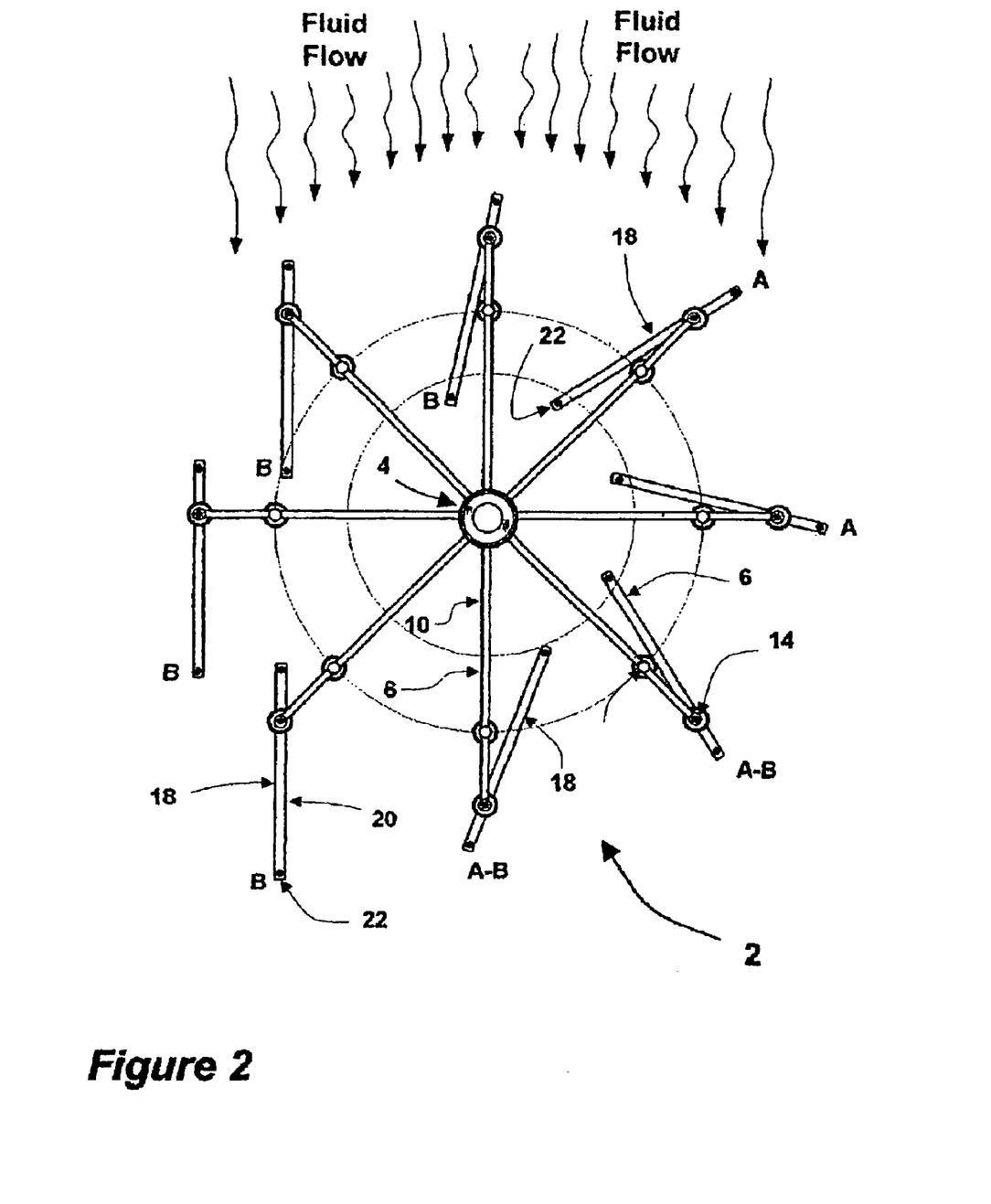
FIG. 2 illustrates a plan view of the preferred embodiment of the prime mover shown in FIG. 1.

Referring firstly to FIGS. 1 and 2 a preferred embodiment of a prime mover 2 comprises a shaft 4, which is cylindrical and has an axis of rotation running through its center. The shaft 4 comprises eight arms 6 which extend radially from the shaft 4, with each adjacent arm having an angular displacement of 45° from the next arm.

Each arm 6 comprises at its distal end, a blade 8. Each arm 6, comprises an upper 10 and lower 12 members, with each blade 8 being pivotably mounted between the upper 10 and lower 12 members by way of a pivot 14. Each arm further includes means to prevent each blade from moving between the first and second positions until the shaft has rotated a prescribed amount, said means comprising a retention bar 16 spanning the space between the upper 10 and lower 12 members.

Use of the preferred embodiment of FIGS. 1 and 2 will now be described.

In use, the shaft 4 is rotatably mounted on a suitable energy generating apparatus, such as a dynamo electricity generator (not shown). Once mounted, the entire apparatus is positioned in a flow of fluid, such as in a stream of air or under water in tidal or river flow.

The prime mover may have braking means (not shown) in order to prevent rotation of the shaft 4 in the flow of fluid, until desired.

In FIGS. 1 and 2, fluid flow is shown as moving in a prescribed direction across the prime mover. In this embodiment, blades are movable between a first position labeled "A" in which the front surface 18 of the blade 8 is substantially perpendicular to the fluid flow, and presents substantially the greatest surface area for fluid impingement and the greatest drag, to a second position "B" in which the front surface 18 of the blade 8 is substantially parallel with the flow of fluid, and wherein the blade 8 presents substantially the smallest surface area for fluid impingement, and the least drag.

It will be appreciated by the skilled reader that between the first position "A" and the second position "B" the blades will present differing sized surface areas for impingement of the fluid and differing drag, these intermediate positions are labeled "A–B".

As fluid flows, the fluid will impinge on the blades 8 in the first position "A". The pressures of the flow of the fluid on the blades 8 in the first position "A" causes rotation of the shaft 4, about the central axis. In this embodiment the shaft 4 is rotated clockwise. When the blades 8 are in the first position "A" they are prevented from being pivoted anticlockwise between the upper 10 and lower 12 members of the arms 6 by the Retention bars 16.

The rotational movement of the shaft 4 can then be converted into electrical power or other power by the energy generating apparatus (not shown) to which the shaft 4 is connected.

As the shaft 4 is rotated, the arms 6 are also rotated, which movement begins to move the attached blades 8 from the first position "A" to the second position "B".

Before reaching the second position "B" the blades 8 move through intermediate positions labeled "A–B" whereby the front face 18 of the blades 8 moves from being substantially perpendicular to the flow of fluid to being substantially parallel with the flow of fluid, with the tip 22 of the blades 8 oriented towards the flow of fluid. Further rotation of the shaft 4, causes the blades 8 in position "A–B" to orient such that the rear face 20 of the blades 8 begins to face the flow of fluid, and thus begins to be impinged by the flow of fluid.

As the rear face 20 of the blades 8 is impinged by the fluid the pressure of the fluid forces the blades 8 to rotate around the pivot 14 into the second position "B". In the second position "B" the tip 22 of the blades 8 is oriented away from the flow of fluid and the front 18 and rear 20 faces of the blades 8 extend substantially parallel with the flow of fluid.

Thus, in the second position "B" the surface area of the blades 8 impinged by the flow of fluid is much smaller than in the first position "A" and hence the drag of the blades 8 is much reduced. Thus, the blades in the second position "B" help to reduce the overall drag of the blades 8 on the rotation of the shaft 4 and therefore reduce loss of energy between the linear fluid movement and rotational movement of the shaft 4.

The arms 6 continue to move as the shaft 4 rotates back to its original position. As the shaft 4 rotates to its original position the blades 8 in the second position "B" are forced by the flow of fluid to pivot back towards the arm 6 to which it is connected and abut the retention bar 16. The blades 8 are then moved back to the first position "A" as the arms 6 are rotated further.

Thus, continual flow of fluid across the prime mover 2 effects continual rotation of the shaft 4 as the arms 6 are rotated and the blades 8 are move from the first position "A" to the second position "B" and back again.

Figure 3:
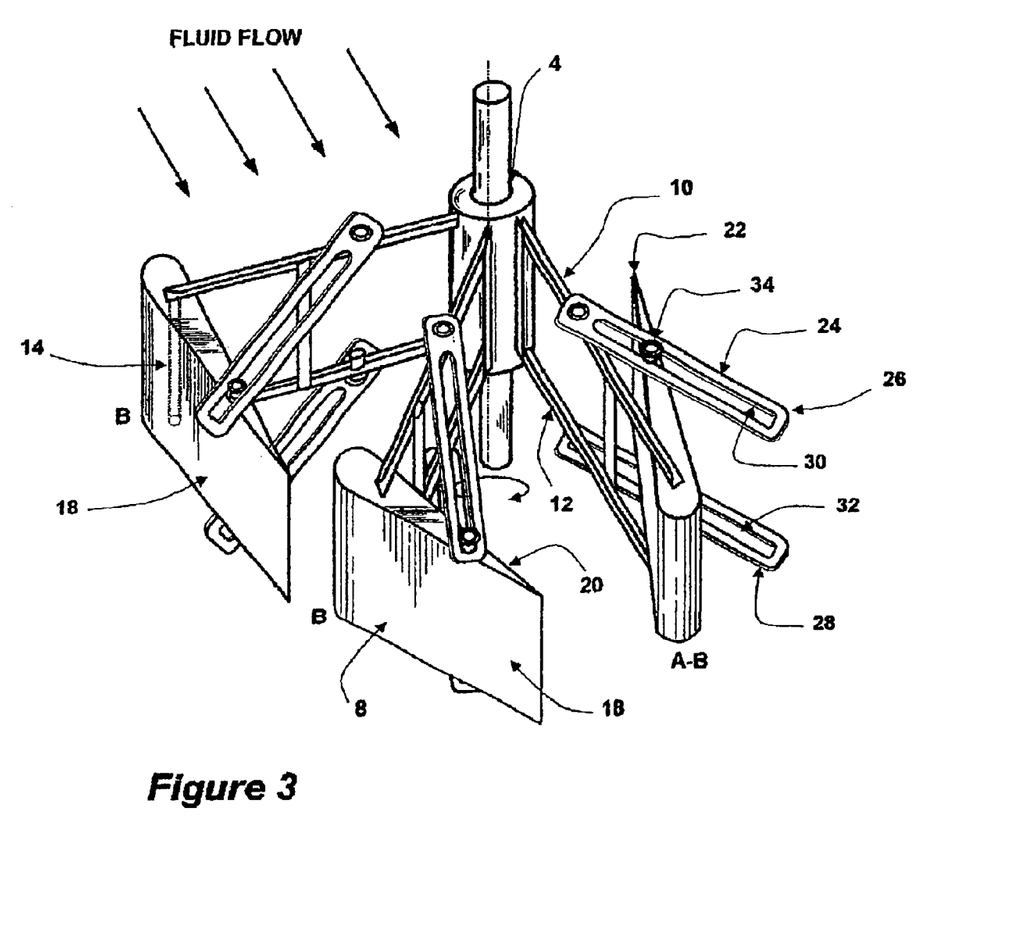
FIG. 3 illustrates a perspective view of a second preferred embodiment of the prime mover of the invention.
Figure 4:
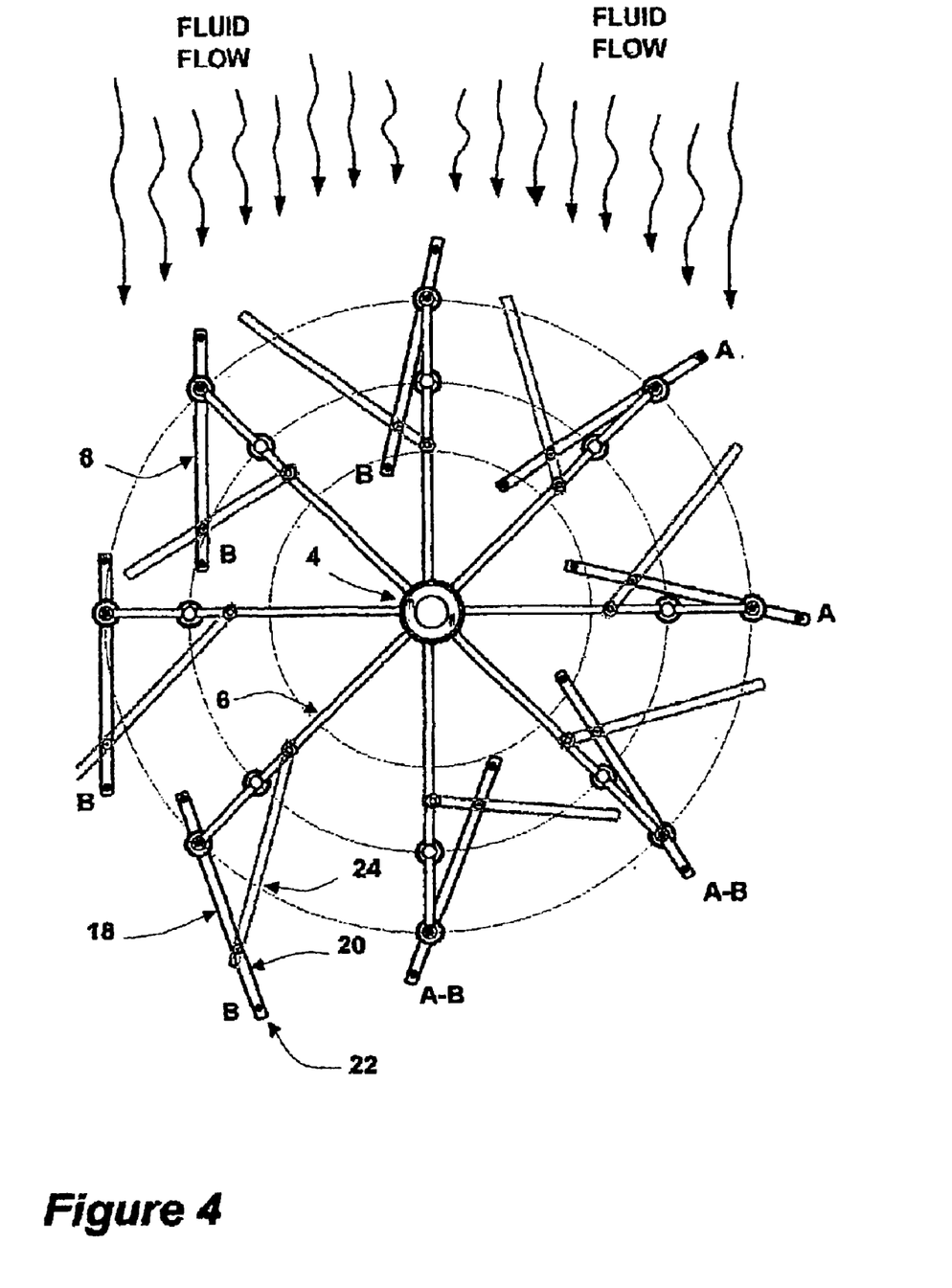
FIG. 4 Illustrates a plan view of the second preferred embodiment of FIG. 3.

Referring now to FIGS. 3 and 4, a second embodiment of the prime mover 2 of the invention includes all the elements of the embodiment described for FIGS. 1 and 2, but include means 24 to limit the movement of the blades 8 to between the first and second positions ("A" and "B" respectively) only. The movement limiting means 24 comprises an upper 26 arm and lower 28 arm extending obliquely from each arm 6 of the prime mover 2. The upper arms 26 and lower arms 28 include upper slots 30 and lower slots 32 respectively. The movement limiting means 24 further comprises guide rods 34, which extends through the blades 8 of the prime mover 2 into the upper 30 and lower 32 slots of each movement limiting means 24.

In use the guide rods 34 cooperate with the upper 30 and lower 32 slots to limit movement of each blade to between the first position "A" and the second position "B" as shown in FIG. 4. In the first position "A" the guide rod is located at the proximal end of the upper 30 and lower 32 slots of the movement limiting means 24. As the shaft 4 of the prime mover 2 is rotated, and the blades 8 are moved from the first "A" to the second "B" positions, the guide rod 34 is moved towards the distal end of the movement limiting means 24 between the upper 30 and lower 32 slots.

The distal ends of the upper 30 and lower 32 slots are closed to prevent the guide rod 34 from leaving the movement limiting means 24. Thus, when the blades 8 reach the second position 'B' the guide rods 34 prevent the blades 8 from rotating further. As the arms 6 rotate further and the blades 8 move back to the first position 'A' the guide rods 34 moves back towards the proximal end of the movement limiting means 24.

The movement limiting means 24 prevent the blades 8 from being moved away from the second position 'B' when the minimum of drag is required on the blades 8, and thus prevents minimum drag configuration and instead adds torque to the prime mover 2.

In an embodiment such as that described in FIGS. 1 and 2, the absence of movement limiting means 24 allows each blade 8 to achieve substantially minimum drag when rotated to position B. This minimum drag effects negative torque on the prime mover, which is subtracted from the power generated by the prime mover 2.

In case of embodiments, such as those of FIG. 3, in which movement limiting means 24 are present, the movement limiting means 24 allow each blade to retain an impact angle against the fluid flow through a smaller angular displacement, which causes each blade 8 to form an oblique angle to the fluid flow for a longer time period and add to the torque of the prime mover.

Figure 5:
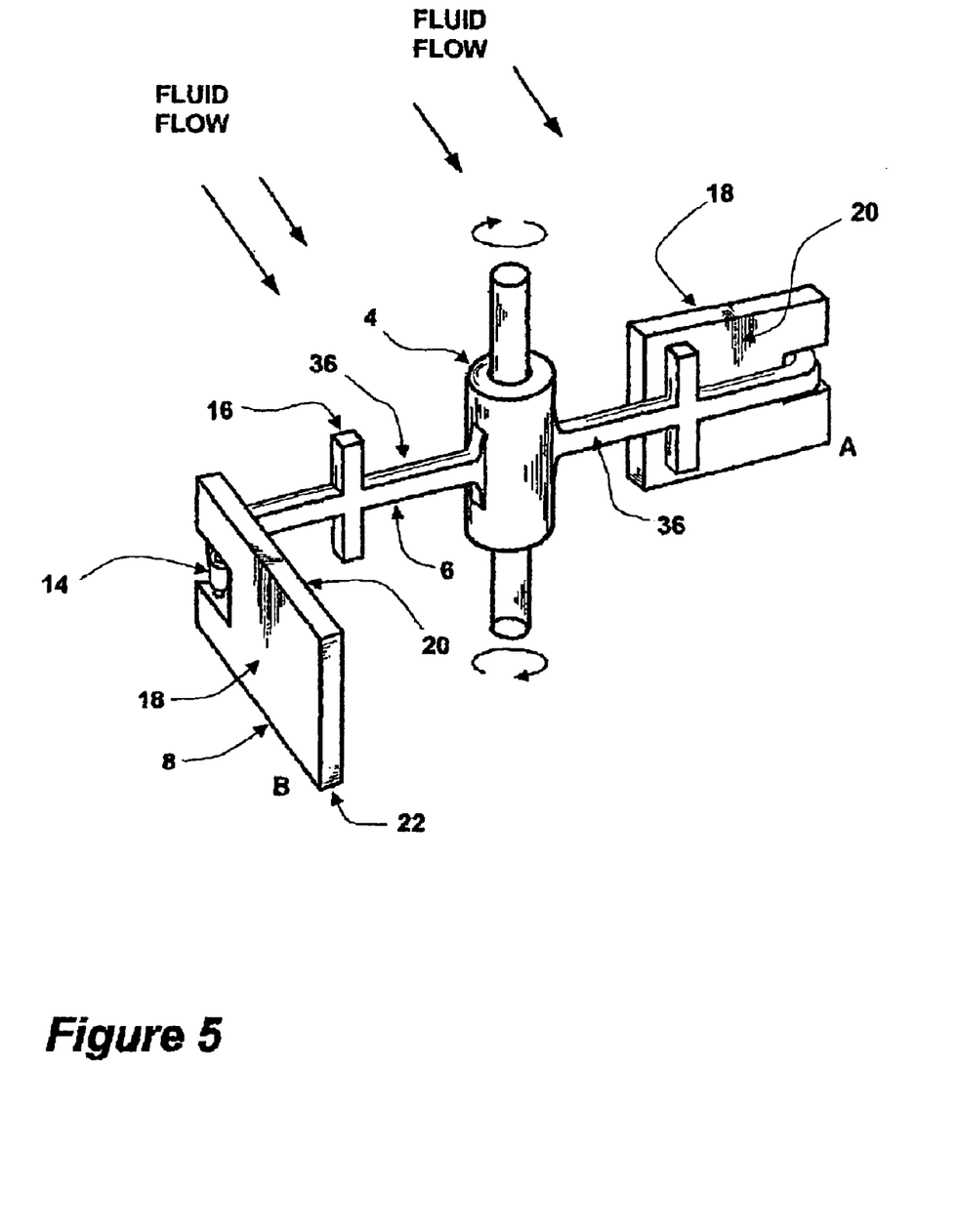
FIG. 5 illustrates a perspective view of a third preferred embodiment of the prime mover of the present invention.

Referring now to FIG. 5 in a third embodiments of the prime mover 2 of the invention, only two arms 6 are shown, each arm 6 comprising a single elongate member 36.

Each elongate member 36 comprises a retention bar 16, which extends above and below the elongate member 36. Blades 8 are pivotably connected to the arms 6 by way of pivots 14. The prime mover 2 of the third embodiment works in substantially the same manner as the first embodiment described for FIGS. 1 and 2. The blades 8 of this embodiment are oriented to be retained in the first position 'A' by the retention bars 16, above and below the elongate members 36.

Figure 6:
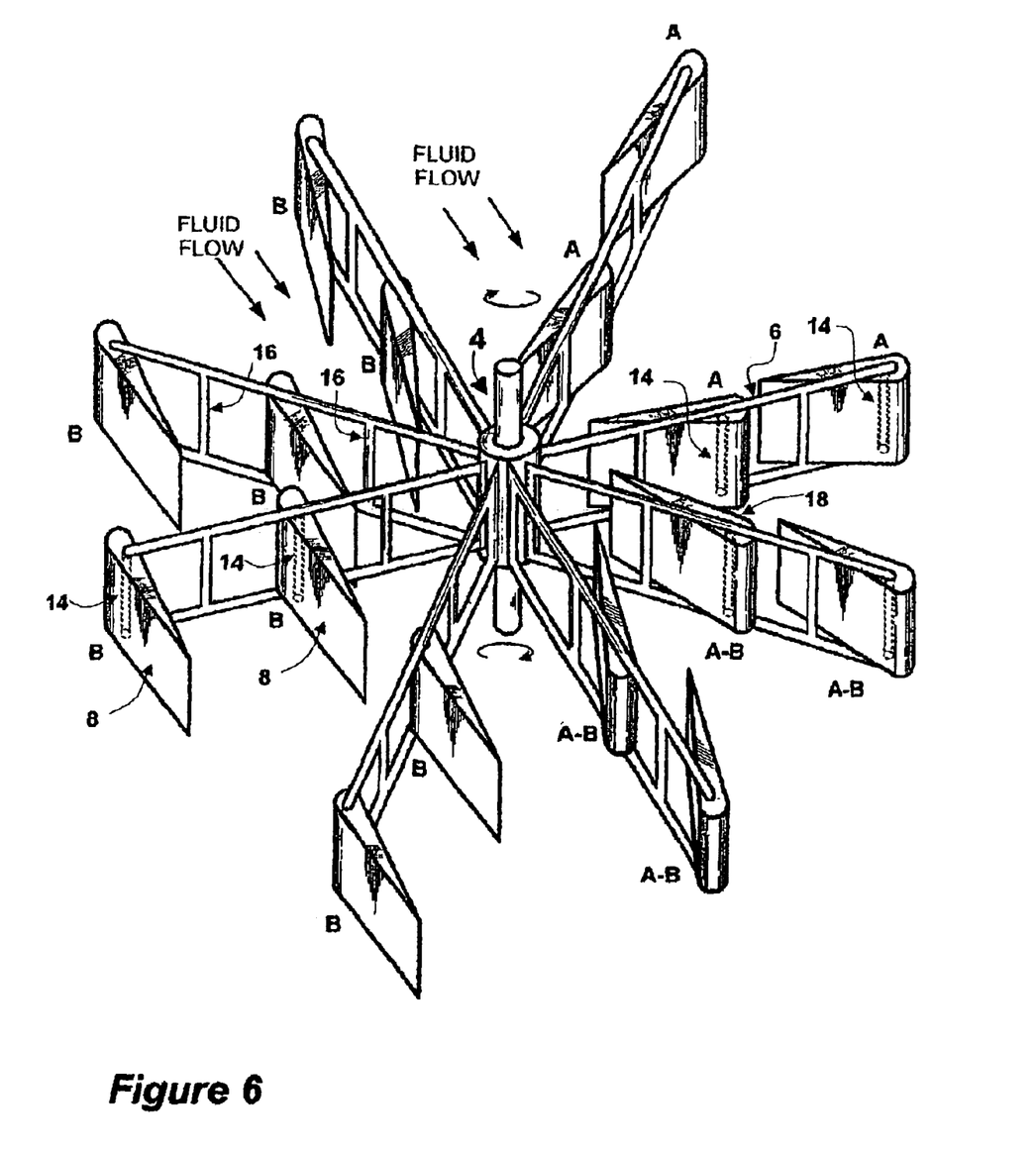
FIG. 6 Illustrates a perspective view of a fourth preferred embodiment of the prime mover of the present invention.

Referring to FIG. 6, in a fourth embodiment of the prime mover 2 of the invention, each arm 6 comprises two blades 8, spaced apart along the arm 6. Each arm comprises two retention bars 16, one for each of the blade 8. Each blade comprises its own pivot 14 and is independently movable from the first position 'A' to the second position 'B' as each arm 6 rotates with the shaft 4. In this fourth embodiment blades 8 are independent from the other, but in another embodiment (not shown), there may be a blade link rod (not shown) connecting all blades 8 of the same arm 6 so as to make the blades move in unison.

The mode of the operation of the fourth embodiment is substantially identical to that described on the embodiment of FIGS. 1 and 2.

Figure 7:
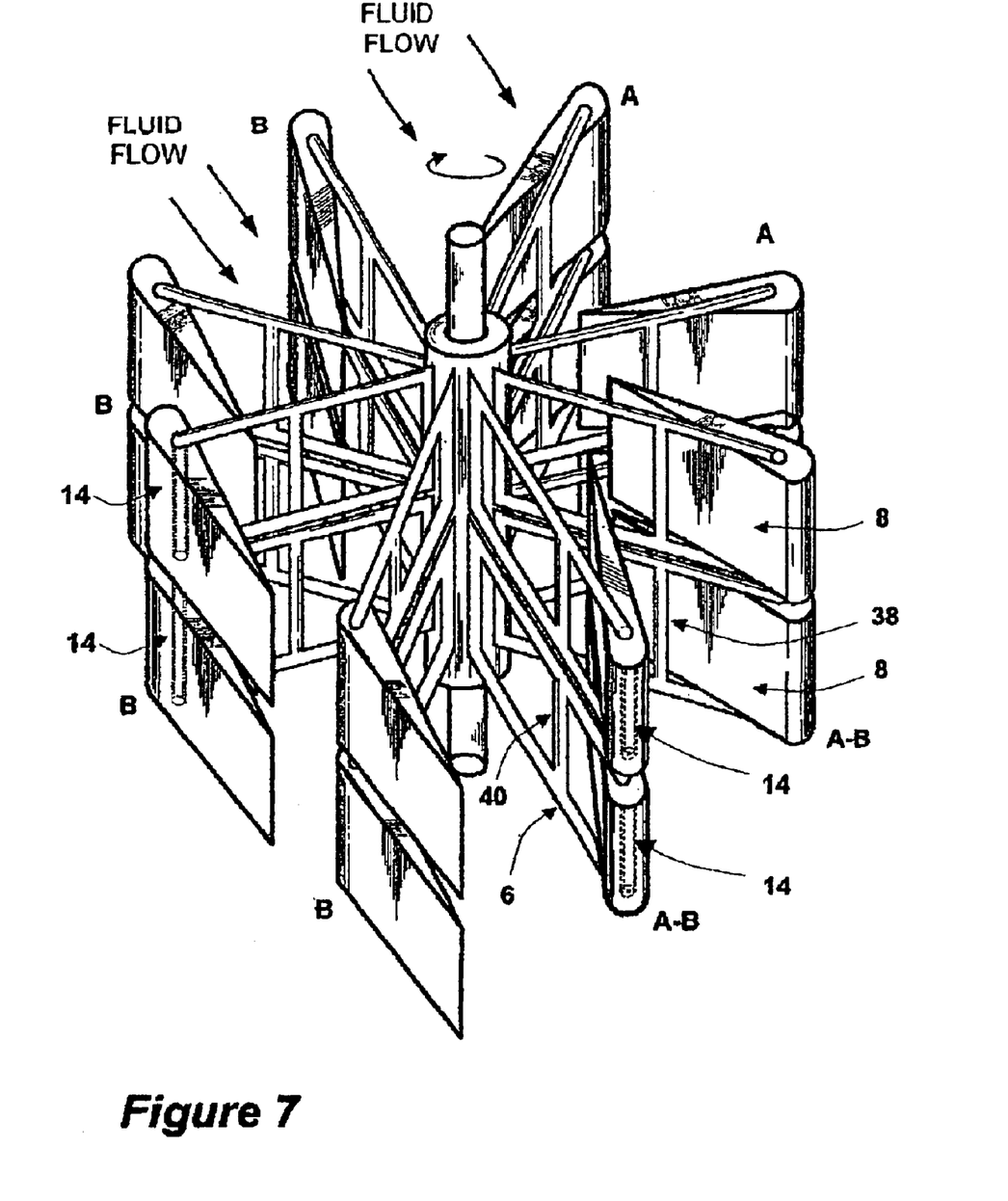
FIG. 7 illustrates a perspective view of a fifth preferred embodiment of the prime mover of the present invention.

Referring now to FIG. 7, in a fifth embodiment of the prime mover 2 of the invention, each arm 6 comprises two blades 8, which are superposed. Each arm 6 comprises upper 38 and lower 40 retention bars, to retain each of the blade. Each blade 8 comprises its own pivot 14, but in another embodiment (not shown) there may be a single pivot running through both blades. The mode of operation of the fifth embodiment is substantially identical to that described for the embodiment of FIGS. 1 and 2.

Figure 8:
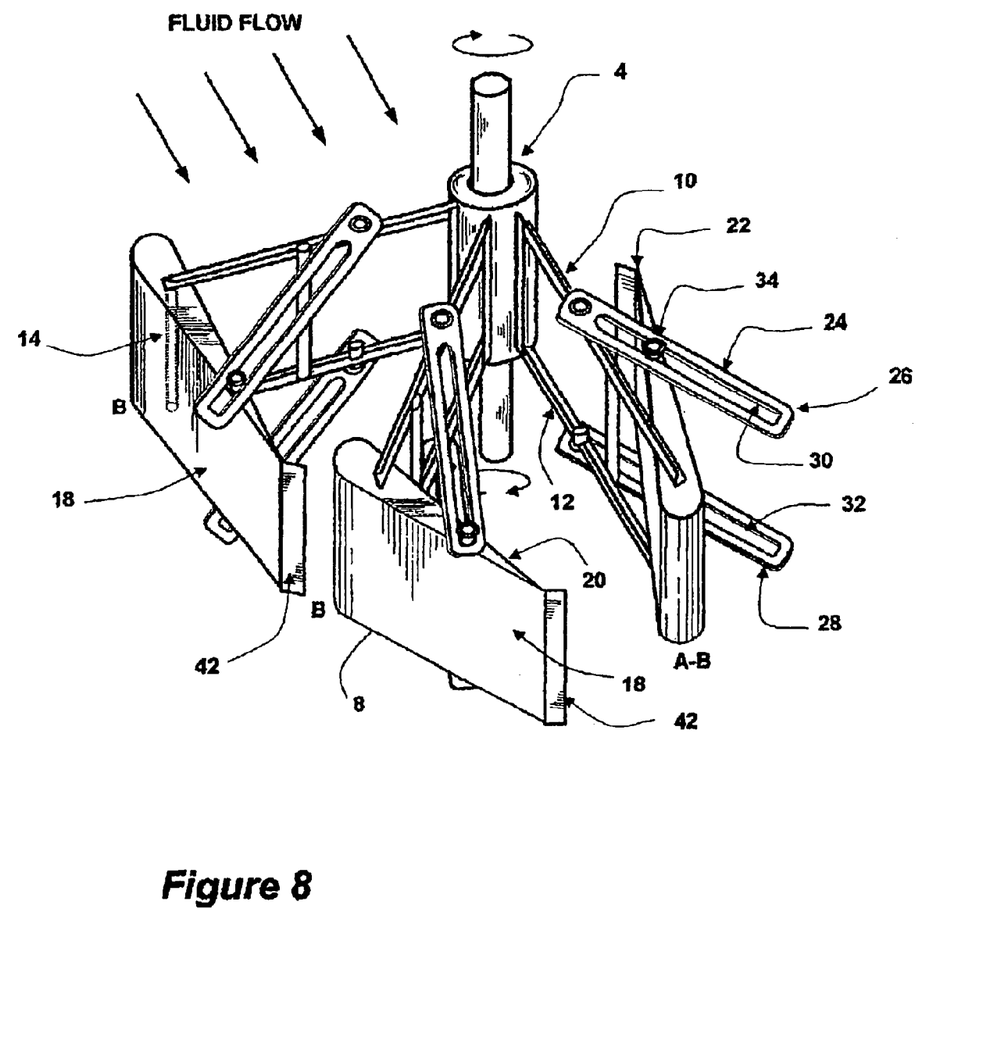
FIG. 8 illustrates a perspective view of a sixth preferred embodiment of the prime mover of the present invention.
Figure 9:
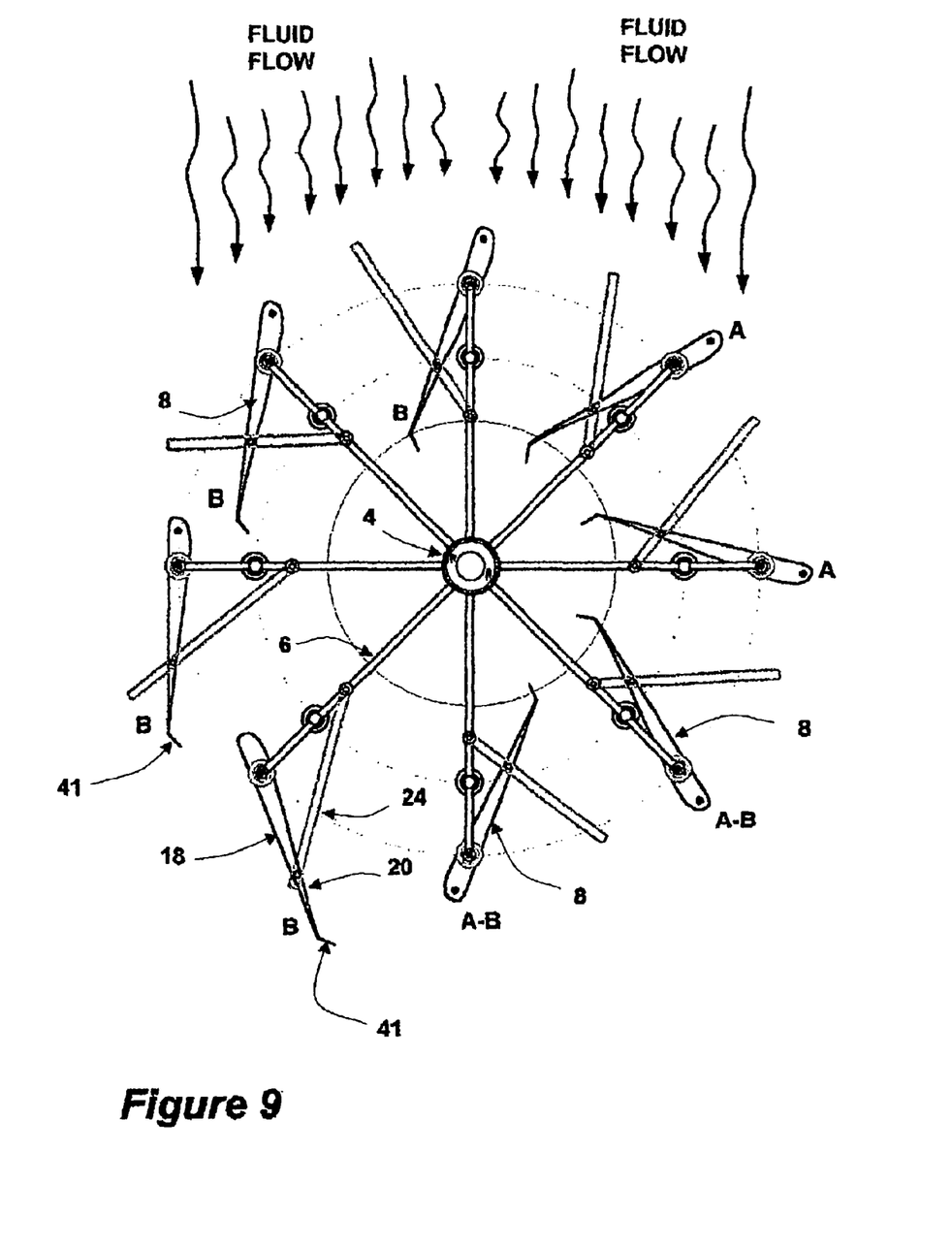
FIG. 9 illustrates a plan view of the sixth preferred embodiment of FIG. 8.

Referring now to FIGS. 8 and 9, a sixth embodiment of the prime mover 2 of the invention includes all the elements of the embodiment described for FIGS. 3 and 4, but now include a trim tab 42 attached to the blade 8 trailing edge or tip 22 of each blade 8 to provide fine tuning adjustment to increase blade efficiency. The trim tab 42, either welded, riveted, or a plate integral part of blade 8, partly spanning or extending fully to cover the whole length along the blade 8 trailing edge or tip 22.

In use, the trim tab 42 alters the blade 8 attitude with reference to the fluid flow every time blades 8 guide rods 34 are not setting at the distal or proximal ends of the movement limiting means 24, thus increases blade efficiency.

Thus, in each of the embodiments described above, movement of the blades 8 from the first position 'A' to the second position 'B' moves the blades from a higher drag orientation to a much lower drag orientation in the fluid, to provide for a reduction in the energy loss exhibited by the prime mover in converting the linear fluid flow into rotational movement.

Figures 10, 10G:
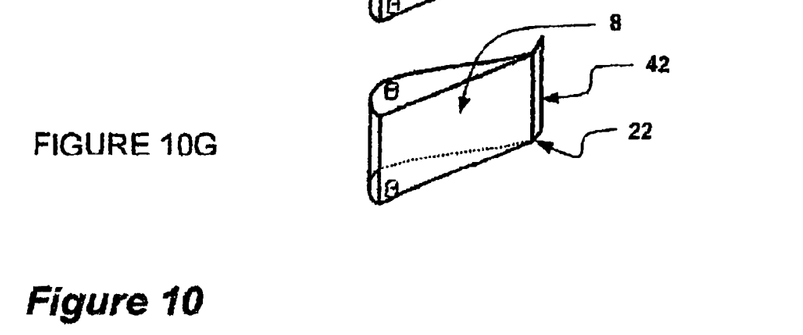
FIGS. 10A–10G illustrates perspective views of preferred blade shapes of the prime mover of the present invention.
Figures 10A, 10B, 10C, 10D:
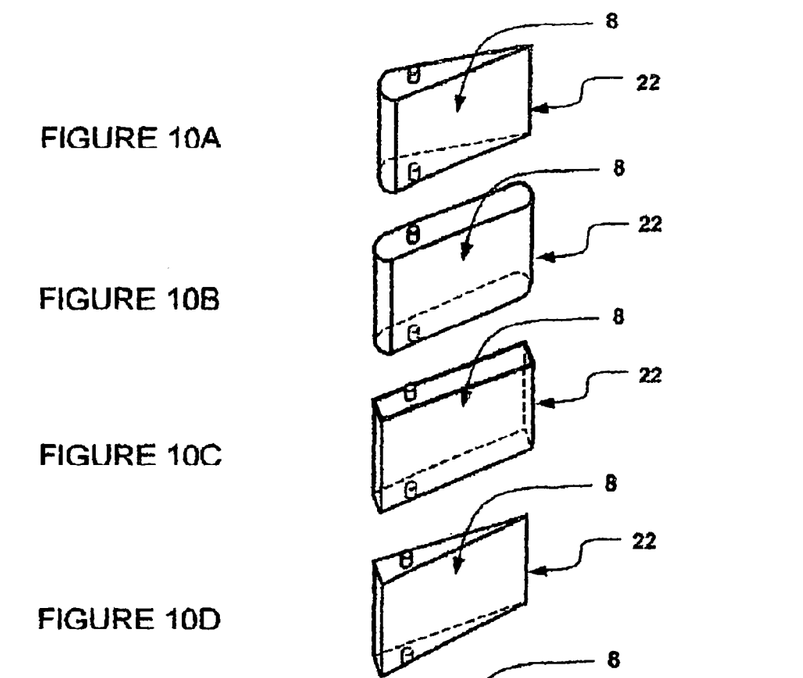
Figures 10E, 10F:
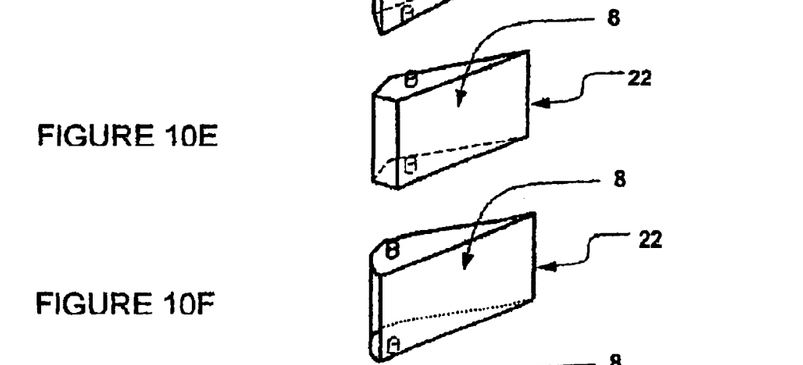

Referring to FIGS. 10A–10G, the shape of the blades 8 is important in order to affect a higher drag in the first position than the second position. Preferred blade shapes include wedge-shaped, whether rounded, as shown in FIG. 10A, angular as shown in FIG. 10D, rectangular parallelepiped-shaped as shown in FIGS. 10B (rounded ends) and 10D (angular ends), blades having a kite-shaped cross-section as shown in FIG. 10E, airfoil-shaped as shown in FIG. 10F, and airfoil-shaped with trim tab attached as shown in 10G. Preferred blade shape of blades 8 could either be with or without trim tabs partly or completely spanning along the blade 8 trailing edge or blade tip 22.

The reader's attention is directed to all papers and documents which are filed concurrently with or previous to this specification in connection with this application and which are open to public inspection with this specification, and the contents of all such papers and documents are incorporated herein by references. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent, or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstracts and drawings), or to any novel one, or any novel combination, of the steps of any method or process so disclosed.

What is claimed is:

1. A prime mover for harnessing energy from flow of a fluid, the prime mover comprising a shaft having a rotational axis, arranged to be rotatably mounted to a substructure, the shaft comprising at least one arm extending radially from the shaft, the at least one arm comprising at least one blade, wherein the at least one blade is oriented such that fluid flow acting on the at least one blade effects rotation of the shaft, wherein the at least one blade is movably mounted on an arm and wherein each blade is movable from a first position, wherein the each blade is substantially perpendicular to the flow of fluid and has a first drag, to a second position, wherein the each blade is substantially parallel with the flow of fluid and has a second drag, wherein the first drag is higher than the second drag, and wherein the at least one blade is provided with a trim tab, attached to or integral with the blade and partly or completely spanning blade tip or the trailing edge of the at least one blade wherein each arm and/or blade comprises means to prevent each blade moving between the first and second position until the shaft has rotated a prescribed distance.

2. A prime mover for harnessing energy from flow of a fluid, the prime mover comprising a shaft having a rotational axis, arranged to be rotatably mounted to a substructure, the shaft comprising at least one arm extending radially from the shaft, the at least one arm comprising at least one blade, wherein the at least one blade is oriented such that fluid flow acting on the at least one blade effects rotation of the shaft, wherein the at least one blade is movably mounted on an arm and wherein each blade is movable from a first position, having a first drag, to a second position, having a second drag, wherein the first drag is higher than the second drag, and wherein the at least one blade is provided with a trim tab, attached to or integral with the blade and partly or completely spanning blade tip or the trailing edge of the at least one blade, wherein each arm and/or blade comprises means to prevent each blade moving between the first and second positions until the shaft has rotated a prescribed distance.

3. A prime mover as claimed in claim 2, wherein the at least one blade is airfoil-shaped.

4. A prime mover as claimed in claim 2, wherein the flow of fluid effects movement of the at least one blade from the first to the second position as the shaft is rotated.

5. A prime mover as claimed in claim 2, wherein the surface area of the at least one blade impinged on by the fluid is greater in the first position than in the second position.

6. A prime mover as claimed in claim 2, wherein the flow of fluid effects movement of the at least one blade from the second position back to the first position as the shaft completes a fill rotation.

7. A prime mover as claimed in claim 2, wherein the prime mover comprises at least two arms, and the at least one blade is in the second position when at least one other blade is in the first position.

8. A prime mover as claimed in claim 2, wherein each blade and/or arm comprises means to limit movement of each blade on an arm to a prescribed amount.

9. A prime mover as claimed in claim 2, wherein each blade is rotatably mounted to an arm such that the blade may be rotated from the first to the second position.

10. A prime mover as claimed in claim 2, wherein each arm and/or blade comprises means to limit movement of each blade on an arm to a prescribed angular displacement of the blade with reference to the corresponding arm.

11. A prime mover as claimed in claim 2, wherein each arm comprises more than one blade, each blade being movably mounted on the arm.

12. A prime mover as claimed in claim 2, wherein the prime mover is arranged to be rotatably mounted to any suitable sub-structure, such as an energy generating apparatus, wherein said suitable sub-structure comprises an energy generating apparatus.

13. A method of generating energy from flow of a fluid, the method comprising mounting the prime mover as claimed in claim 2, to a suitable energy-generating device, and locating the resultant apparatus in the flow of fluid.

14. A method as claimed in claim 13, wherein the prime mover is oriented in the flow of fluid such that the rotational axis of the shaft is oriented substantially vertically with respect to ground level and the arms extend radially substantially horizontally with respect to ground level.

15. A method as claimed in claim 13, wherein the prime mover mounted to the energy generating apparatus is located in the flow of any fluid, air or water.

16. A prime mover as claimed in claim 2, wherein said at least one blade is substantially parallel with said flow of fluid in said second position.

17. An energy-generating device comprising a prime mover for harnessing energy from flow of a fluid, the prime mover comprising a shaft having a rotational axis, arranged to be rotatably mounted to a substructure, the shaft comprising at least one arm extending radially from the shaft, the at least one arm comprising at least one blade, wherein the at least one blade is oriented such that fluid flow acting on the at least one blade effects rotation of the shaft, wherein the at least one blade is movably mounted on an arm and wherein each blade is movable from a first position, having a first drag, to a second position, having a second drag, wherein the first drag is higher than the second drag, and wherein the at least one blade is provided with a trim tab, attached to or integral with the blade and partly or completely spanning blade tip or the trailing edge of the at least one blade connected to an energy generating apparatus, wherein each arm and/or blade comprises means to prevent each blade moving between the first and second positions until the shaft has rotated a prescribed distance.

\* \* \* \* \*